United States Patent
Ben-Tsion

(10) Patent No.: US 8,453,000 B2
(45) Date of Patent: May 28, 2013

(54) METHOD AND SYSTEM FOR REDUCING POWER CONSUMPTION IN AN EMERGENCY SHUT-DOWN SITUATION

(75) Inventor: Ido Ben-Tsion, Ramat Gan (IL)

(73) Assignee: Infinidat Ltd., Herzliya (IL)

( * ) Notice: Subject to any disclaimer, the term of this patent is extended or adjusted under 35 U.S.C. 154(b) by 322 days.

(21) Appl. No.: 12/872,241

(22) Filed: Aug. 31, 2010

(65) Prior Publication Data

US 2012/0054520 A1   Mar. 1, 2012

(51) Int. Cl.
*G06F 1/00*   (2006.01)

(52) U.S. Cl.
USPC ........... 713/322; 713/300; 713/320; 713/324; 711/103; 711/111; 711/118; 711/135

(58) Field of Classification Search
USPC .................. 713/300, 320, 324, 322; 711/103, 711/111, 118, 135
See application file for complete search history.

(56) References Cited

U.S. PATENT DOCUMENTS

| | | | |
|---|---|---|---|
| 5,167,024 A | | 11/1992 | Smith et al. |
| 5,341,493 A | | 8/1994 | Yanai et al. |
| 5,519,831 A | * | 5/1996 | Holzhammer ................. 714/22 |
| 6,487,668 B2 | * | 11/2002 | Thomas et al. ............... 713/322 |
| 6,826,456 B1 | * | 11/2004 | Irving et al. ................. 700/299 |
| 6,829,724 B2 | * | 12/2004 | Farabaugh et al. ............. 714/14 |
| 6,886,120 B2 | * | 4/2005 | Yamazaki ...................... 714/721 |
| 7,062,675 B1 | * | 6/2006 | Kemeny et al. ................ 714/15 |
| 7,089,432 B2 | * | 8/2006 | Schmidt ........................ 713/300 |
| 7,130,962 B2 | | 10/2006 | Garney |
| 7,171,518 B2 | | 1/2007 | Nichols et al. |
| 7,409,587 B2 | | 8/2008 | Perry |
| 7,484,109 B2 | | 1/2009 | Feldman et al. |
| 8,046,595 B2 | * | 10/2011 | Jun .............................. 713/300 |
| 2006/0212644 A1 | | 9/2006 | Acton et al. |
| 2010/0180065 A1 | * | 7/2010 | Cherian et al. ................ 711/103 |

OTHER PUBLICATIONS

"CPU Frequency Control," http://radagast.bglug.ca/epia/epia_howto/x968.html
HP Power Advisor utility: a tool for estimating power requirements for HP ProLiant server systems technology brief, http://h20000.www2.hp.com/bc/docs/support/SupportManual/c01861599/c01861599.pdf.

* cited by examiner

*Primary Examiner* — Brian Misiura
(74) *Attorney, Agent, or Firm* — Wiggin and Dana LLP; Gregory S. Rosenblatt

(57) ABSTRACT

In order to avoid loss of data, computer systems are often connected to a UPS which provides power backup in case of an emergency shutdown resulting from a power failure. However, as UPS units are costly, they take up a lot of physical space and can provide power for a limited period of time, it would be advantageous to improve the efficiency of UPS devices and enable to utilize as much as possible of the UPS power in order to save data to a permanent storage before shutdown. There is provided a method and system for controlling the frequency of one or more processors in computer systems, responsive to an indication of a power failure, and thereby reduce its power consumption, so as to provide more power for writing write-pending data to a non-volatile data storage.

19 Claims, 5 Drawing Sheets

METHOD AND SYSTEM FOR REDUCING POWER CONSUMPTION IN AN EMERGENCY SHUT-DOWN SITUATION

FIELD OF THE INVENTION

This invention relates to protection against loss of data stored on a computer system during an emergency shutdown situation.

BACKGROUND OF THE INVENTION

In many modern computer applications, the integrity of data is of great importance and cannot be compromised even in case of an emergency shutdown or other failure within the computer system. In order to avoid loss of data, such computer systems typically comprise one or more uninterruptible power supply (UPS) units that allow continued activity in the system, even in the face of a sudden power shortage.

For example, often in a computer system, host processors are operatively coupled to one or more permanent storage subsystems via a storage protocol. A host processor may process a transaction by reading relevant data, performing calculations thereon, and writing the results back. The data may be stored at the permanent storage subsystem(s), wherein the process of transferring data to and from the permanent storage subsystem(s) typically includes temporarily storing data and/or metadata in a volatile cache memory (data and/or metadata stored in a cache memory are referred to hereinafter as "data"). Caching is employed by many computer systems for improving input/output (I/O) performance between the storage subsystem(s) and the host(s). In addition, the cache memory may be used to improve internal storage system operations such as error logging, recovery, reconstruction, etc. However, at the time of a power failure any transactions in progress and respective data temporarily stored in the volatile cache may be lost, and the integrity of data may be compromised.

In order to protect against loss of data, a UPS is often used. The UPS should allow enough time of activity to handle tasks that would prevent loss of user data as well as of internal information or metadata. Typically, this means that data that is currently in memory but has not yet been permanently stored in non-volatile media has to be taken care of during the time allowed by the UPS.

However, UPS units are costly they take up a lot of physical space, and can provide power for a limited period of time. Furthermore, even though computer systems are often programmed to complete all crucial tasks, such as saving data to non-volatile storage, within the time provided by the UPS, it may often be the case that a UPS fails to fully charge, and therefore does not have enough power to enable the completion of all pending tasks before it is shut down.

Thus, it would be advantageous to improve the efficiency of UPS units and enable to utilize as much as possible of the UPS power, even in the case of incomplete charge, in order to save data to the permanent storage before shutdown.

Prior art references considered to be relevant as background to the invention are listed below. Acknowledgement of the references herein is not to be inferred as meaning that these are in any way relevant to the patentability of the invention disclosed herein.

US Patent Application 2006/212644 entitled "Non-volatile backup for data cache" discloses a non-volatile data cache having a cache memory coupled to an external power source and operable to cache data of an external data device such that access requests for the data can be serviced by the cache rather than the external device. A non-volatile data storage device is coupled to the cache memory. An uninterruptible power supply (UPS) unit is coupled to the cache memory and the non-volatile data storage device so as to maintain the cache memory and the non-volatile storage device in an operational state for a period of time in the event of an interruption in the external power source.

U.S. Pat. No. 7,484,109 discloses a system for placing and maintaining a computer in a standby mode during a power failure, the system comprising: a mains power failure sensor; a source of standby power, the source of standby power being less than the power available for full operation; a volatile memory arranged to be powered from the source of standby power in the event of a failure of mains power; and a processor operative responsive to the mains power failure sensor to store status information on the volatile memory and reduce power demand of the processor and associated devices to no more than that available from the source of standby power. In an exemplary embodiment the source of standby power is one of a battery, a capacitor, a flywheel energy storage system and a power over Ethernet connection.

U.S. Pat. No. 5,167,024 discloses a power manager within a portable laptop computer which provides power and clocking control to various units within the computer in order to conserve battery power. Transistor switches controlled by the power manager control the distribution of power and/or clock signals to the various units within the computer. The power manager includes a software routine for continually monitoring the various units and when these units are either not needed and/or not currently in use, power and/or clock signals are removed from a given unit.

SUMMARY OF THE INVENTION

According to one aspect of the invention there is provided computer system comprising: a storage control module operatively coupled to at least a volatile cache memory and to a non-volatile data storage and being operable to control writing of write-pending data from the volatile cache memory to the non-volatile data storage; a UPS operatively coupled to at least the storage control module, the volatile cache memory and the non-volatile data storage; and a power control unit operatively coupled to at least one processor associated with the non-volatile data storage and, responsive to an indication of a power failure, operable to control a frequency of at least one processor associated with said storage control module, so as to reduce its power consumption rate and provide extended time for writing said write-pending data to the non-volatile data storage.

According to certain embodiments of the present invention the processor is configured for executing writing instructions for writing data from the volatile cache memory to the non-volatile data storage and wherein the power control unit is further configured to obtain a writing speed to the non-volatile data storage and control the frequency of the processor as to adapt the frequency to the writing speed.

According to certain embodiments of the present invention the system further comprises one or more fans configured for cooling, and in response to the indication, the power control unit is further operable to disable at least one of the fans as to provide more UPS capacity for writing the write-pending data to the non-volatile data storage.

According to certain embodiments of the present invention the power control unit is further operable to monitor the temperature of at least the storage control module and in case the temperature exceeds a predefined threshold, to re-activate at least one of the disabled fans.

According to another aspect of the invention there is provided a method for operating a computer system comprising a storage control module operatively coupled to a volatile cache memory and to a non-volatile data storage being operable to control writing of write-pending data from the volatile cache memory to the non-volatile data storage, the method comprising: in response to an indication of a power failure, operating a UPS operatively coupled to at least the storage control module, the volatile cache memory and the non-volatile data storage; and, controlling a frequency of at least one processor associated with the storage control module, so as to reduce its power consumption rate and provide extended time for writing said write-pending data to the non-volatile data storage.

According to certain embodiments the method further comprises: utilizing the processor for executing writing operations for writing data from the volatile cache memory to the non-volatile data storage; and obtaining a writing speed to the non-volatile data storage and adapting the frequency to the writing speed.

According to certain embodiments of the present invention the non-volatile data storage is a storage which is external to a permanent storage subsystem operatively coupled to the storage control module.

According to certain embodiments of the present invention the storage system further comprises one or more fans configured for cooling and in response to an indication of a power failure the method further comprising disabling at least one of the fans and providing more power for writing the write-pending data to the non-volatile data storage.

According to certain embodiments of the present invention the method further comprises monitoring the temperature of one or more of the one or more components and in case the temperature exceeds a predefined threshold, re-activating at least one fan.

According to certain embodiments of the present invention the method further comprises monitoring the temperature of at least the non-volatile data storage and in case the temperature exceeds a predefined threshold, re-activating at least one fan; in case the temperature is lower than a predefined threshold, de-activating one or more operating fans; thereby reducing the power consumption by the one or more fans, while avoiding damage which may result from overheating.

According to a further aspect of the invention there is provided a power control unit configured to be operatively coupled to a computer system, the computer system comprising at least a storage control module operatively coupled to at least a volatile cache memory and to a non-volatile data storage and being operable to control writing of write-pending data from the volatile cache memory to the non-volatile data storage; and, a UPS operatively coupled to at least the storage control module, the volatile cache memory and the non-volatile data storage; the power control unit is configured to be coupled to at least one processor associated with the non-volatile data storage and, responsive to an indication of a power failure, operable to control a frequency of at least one processor associated with said storage control module, so as to reduce its power consumption rate and provide extended time for writing said write-pending data to the non-volatile data storage.

According to yet another aspect of the present invention there is provided a program storage device readable by machine, tangibly embodying a program of instructions executable by the machine to perform a method step for operating a computer system comprising a storage control module operatively coupled to a volatile cache memory and to a non-volatile data storage being operable to control writing of write-pending data from the volatile cache memory to the non-volatile data storage, the method comprising: in response to an indication of a power failure, operating a UPS operatively coupled to at least the storage control module, the volatile cache memory and the non-volatile data storage; and, controlling a frequency of at least one processor associated with said storage control module, so as to reduce its power consumption rate and provide extended time for writing said write-pending data to the non-volatile data storage.

BRIEF DESCRIPTION OF THE DRAWINGS

In order to understand the invention and to see how it may be carried out in practice, embodiments will now be described, by way of non-limiting example only, with reference to the accompanying drawings, in which.

DETAILED DESCRIPTION

Figure 1:
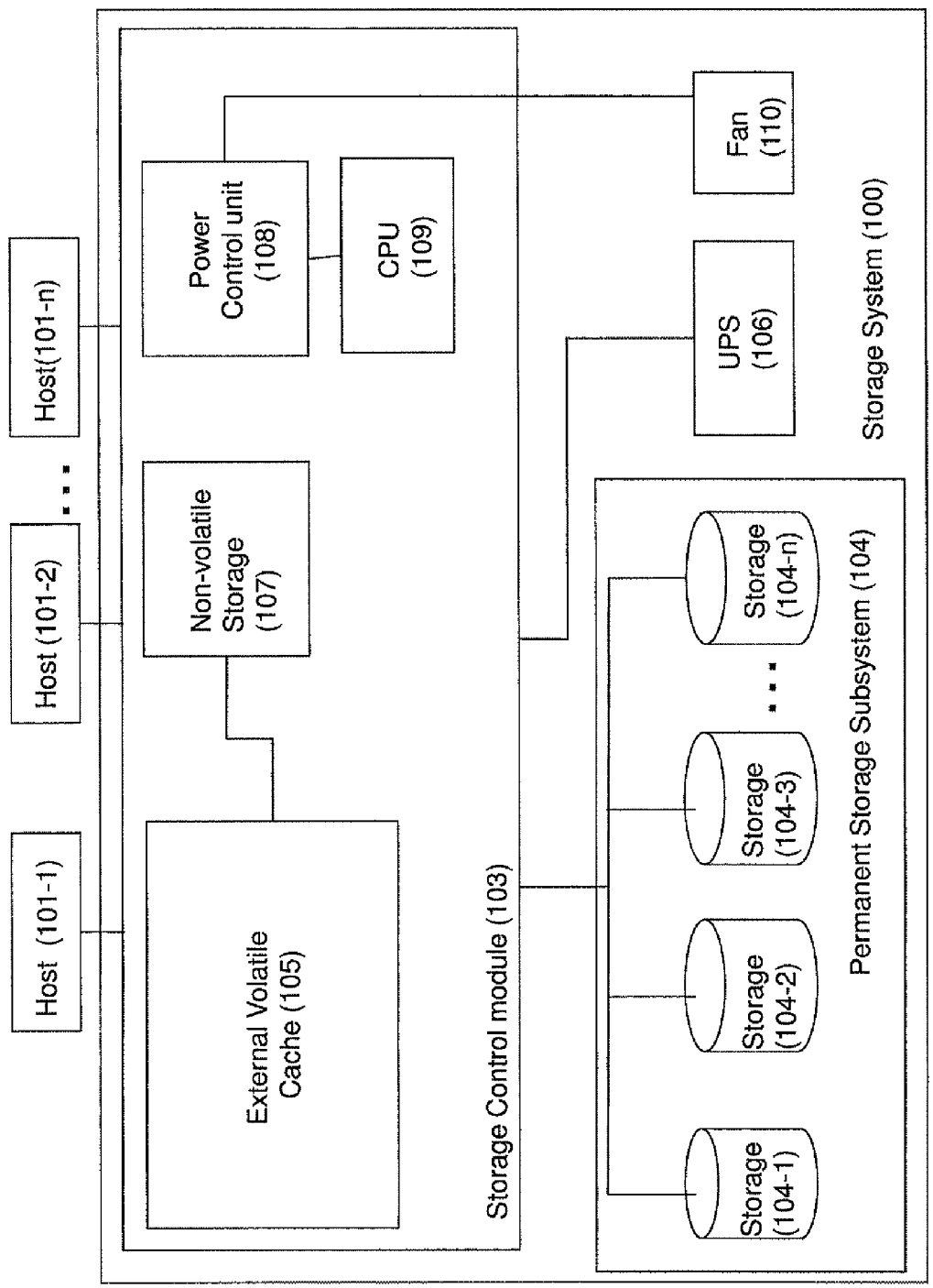
FIG. 1 illustrates a first generalized functional block diagram of a storage system in accordance with certain embodiments of the present invention.

In the drawings and descriptions set forth, identical reference numerals indicate those components that are common to different embodiments or configurations.

Unless specifically stated otherwise, as apparent from the following discussions, it is appreciated that throughout the specification discussions utilizing terms such as "processing", "controlling", "configuring", "obtaining", "receiving", "enabling", "disabling", "performing", "executing" or the like, include action and/or processes of a computer that manipulate and/or transform data into other data, said data represented as physical quantities, e.g. such as electronic quantities, and/or said data representing the physical objects. The term "computer" should be expansively construed to cover any kind of electronic device with data processing capabilities, including, by way of non-limiting example, a personal computer, a server, a computing system, a communication device, a processor (e.g. digital signal processor (DSP), a microcontroller, a field programmable gate array (FPGA), an application specific integrated circuit (ASIC), etc.), any other electronic computing device, and or any combination thereof.

The operations in accordance with the teachings herein may be performed by a computer specially constructed for the desired purposes or by a general purpose computer specially configured for the desired purpose by a computer program stored in a computer readable storage medium.

As used herein, the phrase "for example," "such as", "for instance" and variants thereof describe non-limiting embodiments of the present invention. Reference in the specification to "one embodiment", "an embodiment", "some embodiments", "another embodiment", "other embodiments", "certain embodiments", "one instance", "some instances", "one case", "some cases", "other cases" or variants thereof means that a particular feature, structure or characteristic described in connection with the embodiment(s) is included in at least one embodiment of the invention. Thus the appearance of the phrase "one embodiment", "an embodiment", "some embodiments", "another embodiment", "certain embodiments", "other embodiments", "one instance", "some instances", "one case", "some cases", "other cases" or variants thereof does not necessarily refer to the same embodiment(s).

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination.

Figure 2:
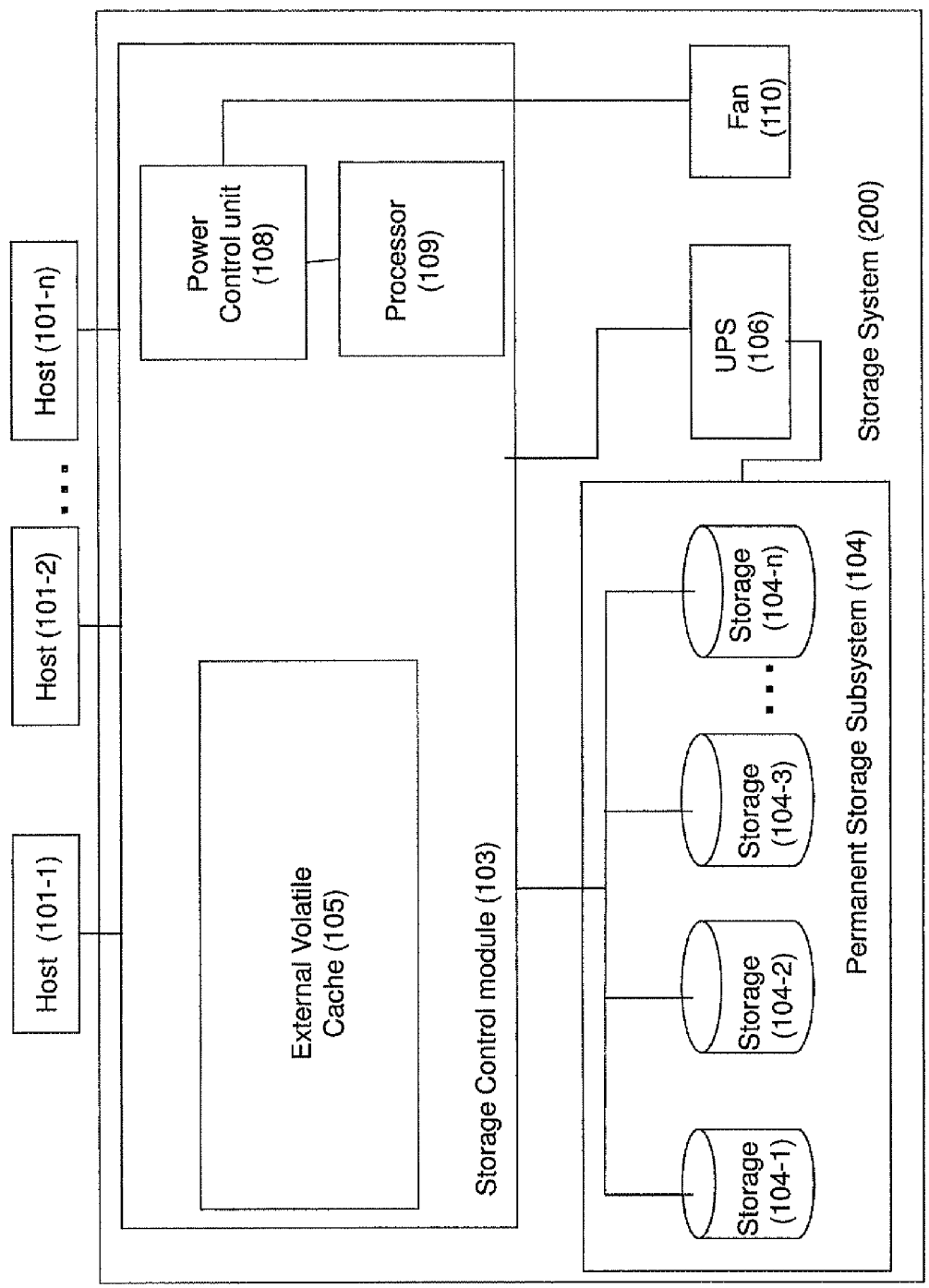
FIG. 2 illustrates a second generalized functional block diagram of a storage system in accordance with certain embodiments of the present invention.
Figure 3:
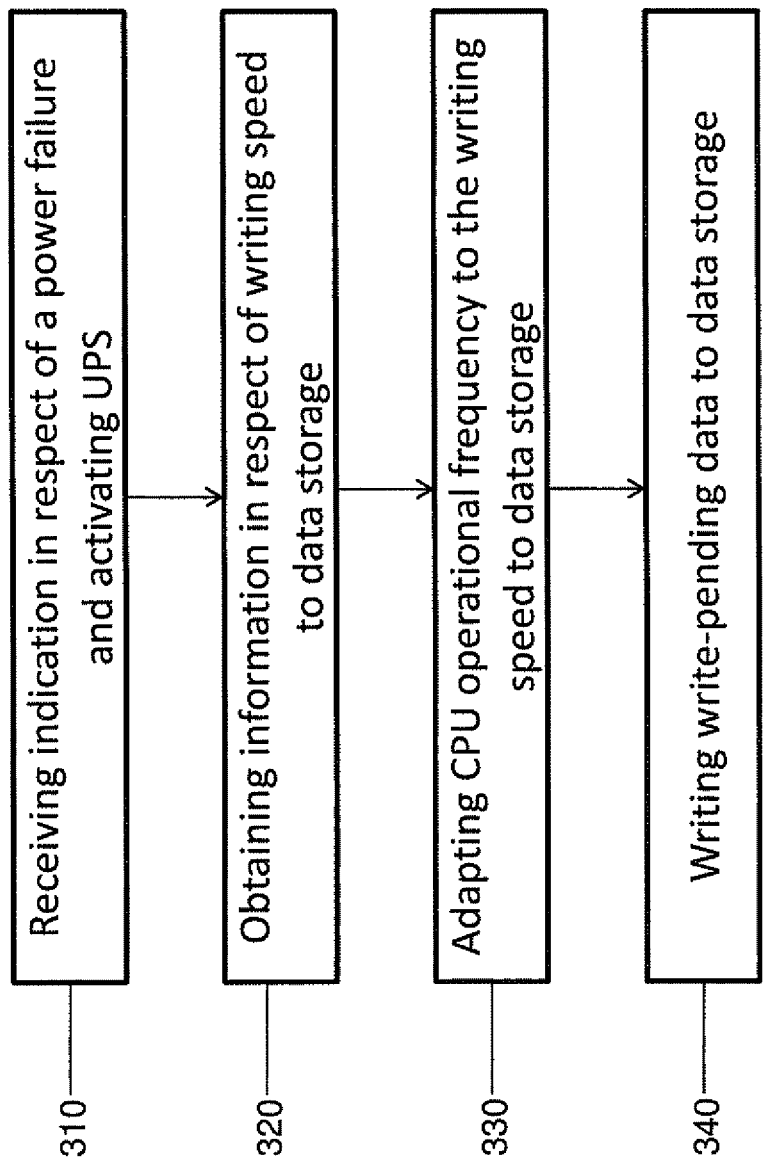
FIG. 3 illustrates a first generalized flow-chart of operations carried out in accordance with certain embodiments of the present invention.
Figure 4:
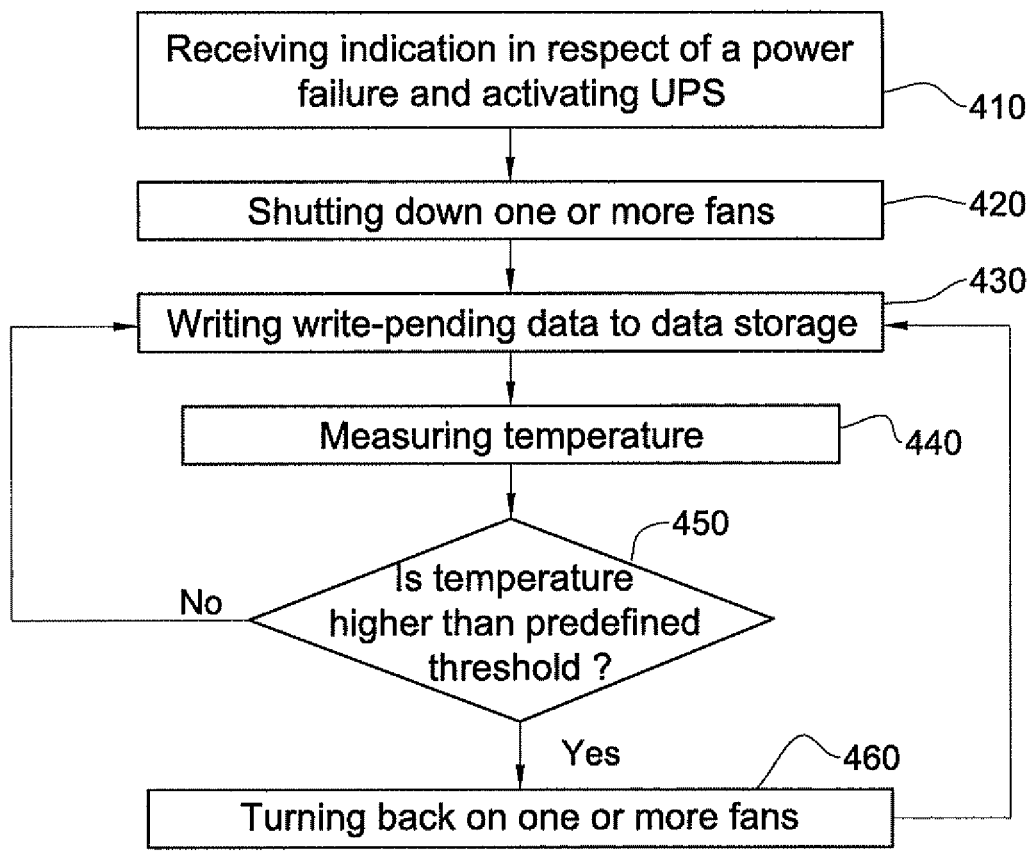
FIG. 4 illustrates a second generalized flow-chart of operations carried out in accordance with certain embodiments of the present invention.
Figure 5:
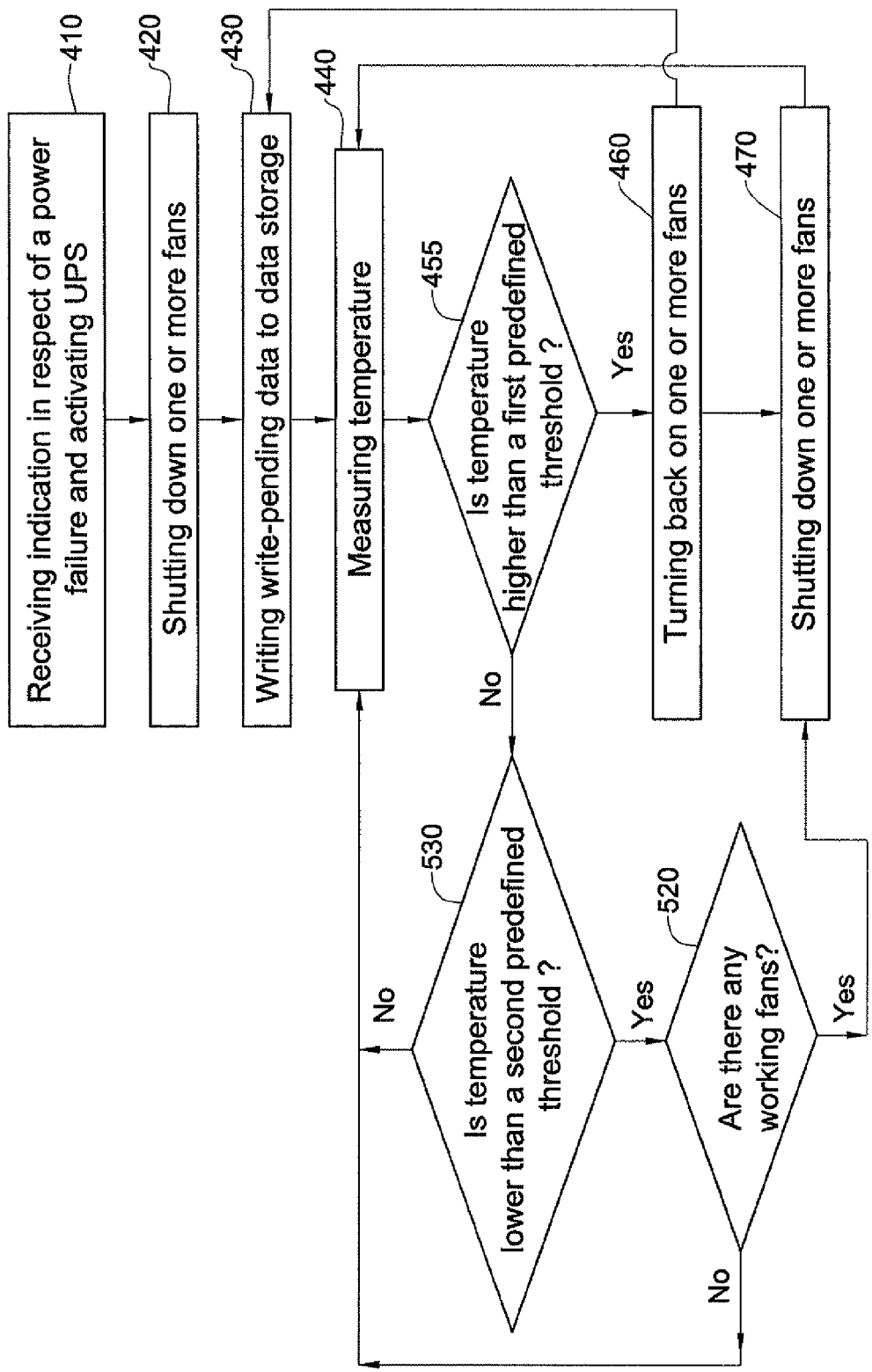
FIG. 5 illustrates a third generalized flow-chart of operations carried out in accordance with certain embodiments of the present invention.

In embodiments of the invention, fewer, more and/or different stages than those shown in FIGS. 3, 4 and 5 may be executed. In embodiments of the invention one or more stages illustrated in FIGS. 3, 4 and 5 may be executed in a different order and/or one or more groups of stages may be executed simultaneously. FIGS. 1 and 2 illustrate a general schematic of the system architecture in accordance with an embodiment of the invention. Each module in FIGS. 1 and 2 can be made up of any combination of software, hardware and/or firmware that performs the functions as defined and explained herein. The modules in FIGS. 1 and 2 may be centralized in one location or dispersed over more than one location. In other embodiments of the invention, the system may comprise fewer, more, and/or different modules than those shown in FIGS. 1 and 2.

Bearing this in mind, attention is drawn to FIG. 1 illustrating a schematic functional diagram of a computer storage system 100 in accordance with certain embodiments of the present invention. The computer system comprises one or more host computers (illustrated as 101-1 to 101-n) sharing common storage means provided by a storage system 100. The storage system comprises a storage control module 103 operatively coupled to one or more host computers (101-1 to 101-n) and to a permanent storage subsystem 104 comprising one or more storage devices (e.g. specialized NAS file servers, general purpose file servers, SAN storage, stream storage device, etc.) illustrated as 104-1, to 104-n. The storage devices may comprise any permanent storage medium, including, by way of non-limiting example, one or more disk drives and/or one or more arrays of disk drives, and may communicate with the host computers and within the storage system in accordance with any appropriate storage protocol. The storage control module 103 is configured to control I/O operations between the host computers and the permanent storage subsystem 104. Upon receiving a write command from a host computer, storage control module 103 enables writing data to at least one storage device of the plurality of storage devices (104-1 to 104-n), and, on receiving a read command from the host computer, enables reading data from at least one storage device of the plurality of storage devices and transmitting this data to the host computer.

The one or more computers (101-1 to 101-n) may be, but are not limited to, a personal or portable computer, a server computer, a PDA, cellular phone or any other apparatus having the appropriate processing infrastructure (software and hardware) for running an appropriate process (e.g. client process) and communicating over a communication network with storage system 100. Storage system 100, can be implemented for example, as a dedicated server-computer characterized by one or more of the following features: faster CPU, high performance RAM, multiple hard drives and a large storage space.

The storage control module 103 comprises an external volatile cache memory 105 for temporarily storing the data to be written to the storage devices in response to a write command and/or for temporarily storing the data to be read from the storage devices in response to a read command. Volatile cache memory is external in respect of permanent storage subsystem 104. During a write operation the data is temporarily retained in volatile cache memory 105 until subsequently written to one or more data storage devices. Such temporarily retained data is referred to hereinafter as "write-pending" data (also known as "dirty data"). Write pending data in the volatile cache memory 105 may be lost when power supply to the cache memory is interrupted.

The control unit (of storage control module 103) notifies the host computer of the completion of the write operation when the respective data has been written to the cache memory. Accordingly, the write request is acknowledged prior to the write-pending data being stored in the permanent storage subsystem. Once the write-pending data is sent to the respective permanent storage medium, its status is changed from "write-pending" to "non-write-pending", (also known as "clean data") and the storage system relates to this data as stored at the permanent storage medium and allowed to be erased from the cache memory.

However, in addition to the volatile cache memory 105, a typical permanent storage subsystem (104) has its internal cache memory (not illustrated in FIG. 1), e.g. each disk drive may have its own internal caching mechanism, or several disk drives may have a shared cache, etc. The internal cache memory enables optimizing the writing process in the permanent storage subsystem. Consequently, for a certain period of time (up to several seconds), data which is identified as "non-write-pending" data is not really stored in a non-volatile storage medium. If a power failure takes place (e.g. a sudden loss of power from the main power sources) precisely at that time, then the data would be lost. Moreover, since the storage system in general has no control or even knowledge of the internal caching system of the permanent storage subsystem, the data is not only lost, but its status is considered by the system as safely stored data. This may create a dangerous situation of false or inconsistent data retrieval after recovery from the power failure. As known in the art, the danger of false or inconsistent data retrieval may be avoided by working in a "write through" mode, i.e., without implementing internal caching in the permanent storage subsystem. However, the "write through" mode may seriously affect the performance of the disk drives and hence is less applicable for mass-storage systems and, especially, for enterprise storage systems.

Accordingly, in order to avoid loss of data, storage control module 103 can further comprise (or be associated with) a non-volatile data storage unit 107 which enables to safely store write-pending data in the event of a power failure. Description in respect of non-volatile storage unit 107 is found in PCT application PCT/IL 2009/000818, which is incorporated herein by reference in its entirety. Non-volatile data storage unit 107 is operatively coupled to the volatile cache memory 105. The non-volatile data storage unit 107 may be implemented, by way of non-limiting example, as a non-volatile cache memory, flash memory, disk drive(s), etc., located within storage control module 103 or connected to storage control module 103 as an external unit.

In addition, storage control module 103 is connected to one or more uninterruptable power supply (UPS) units 106 configured to provide power to storage control module 103 in case of power failure. In case non-volatile storage unit 107 and/or the operational cache memory 103 are located externally to storage control module 103, they shall be also connected and powered by a UPS 106.

In response to an indication of a power failure, UPS 106 becomes operative to provide power to storage control module 103. In order to avoid any loss of data, the UPS 106 provides power at least for the period of time required for writing pending-data to non-volatile storage unit 107. As mentioned above, UPS 106 units are costly, they take up a lot of physical space and can provide power for a limited period of time. In addition, as further mentioned above, it may occur that a UPS is not fully charged at the time of power failure, (e.g. as a result of a malfunction) and therefore fails to provide the expected power, which is required for completing all crucial tasks before its complete shutdown. Thus it would be advantageous to minimize the number of UPS units which are used while efficiently exploiting the power which is provided by each UPS unit.

To this end, storage control module 103 can further comprise (or be associated with) a power control unit 108 which is operatively coupled to CPU 109, the CPU being configured to manage and control different modules and operations associated with storage control module 103. More specifically CPU is configured for executing any writing operation to non-volatile storage unit 107. Responsive to an indication of a power failure, power control unit 108 is configured to control the operational CPU frequency (i.e. the frequency in which the CPU operates). It should be noted that although the term CPU (central processing unit) is used herein in its singular form, it should be interpreted to include any one or more processors operationally coupled to storage control module 103.

A CPU working in full capacity (maximum frequency) consumes power (e.g. about 65-80 Watts), which can be reduced when made to work at a lower frequency. In general, the relationship between the operational CPU frequency and its power consumption is linear, or close to linear. Thus, by controlling the CPU clock speed during operation, the energy consumption of the CPU can be controlled as well.

In an emergency shutdown, due to power failure, computer systems which utilize a UPS for power backup, are often programmed to perform a set of predetermined actions which have specific importance to an emergency shutdown process (e.g. storing data in non-volatile storage), while other actions which are not crucial for the emergency shutdown process are not performed. Typically, these actions can be completed with an operational CPU frequency which is less than maximal. However, in some cases, as a result of the activity of the processor in a power failure scenario, the CPU frequency is higher than needed. Moreover, often a time gap exists from the time an indication in respect of a power failure is received and until the frequency of the CPU is actually reduced. During this time gap, valuable UPS capacity (e.g. UPS power) is wasted on excessive CPU frequency, which does not contribute to the completion of the pending tasks.

Accordingly, power control unit 108 can be configured to force a reduction of the CPU frequency immediately after an indication of a power failure is received and thereby enables reducing any unnecessary power consumption by the CPU without delays.

Furthermore, as explained above, in a power failure scenario, UPS power is utilized for writing write-pending data to a non-volatile memory in order to avoid loss of data. The speed of the writing process is dependent on the writing speed to the non-volatile memory, where different types of computer memories have different I/O speeds.

Since the bottleneck of the writing process is the writing speed to non-volatile data storage (e.g. data storage 107), a CPU which is operating at a frequency which is substantially greater than this writing speed would spend valuable power on its operation while failing to increase the speed of the writing process. On the other hand, a CPU which is operating at a frequency which is substantially slower than the writing speed to non-volatile data storage (e.g. data storage 107) would spend valuable time consuming energy and being idle, while the disk is ready and waiting for further writing instructions.

Accordingly, power control unit 108 can be configured to adapt the operational CPU frequency, according to the writing speed, to the non-volatile data storage (e.g. non-volatile data storage 107). The adapted CPU operational speed reduces the power consumption rate of the CPU while not hindering the writing speed of the write-pending data to the non-volatile data storage. This enables to direct the consumption of the UPS capacity (e.g. UPS power) for writing tasks and extend the period of time during which the storage control module, the volatile cache memory, and the non-volatile data storage unit are maintained in an operational state and thereby providing a longer time for writing data from the volatile cache memory 105 to the non-volatile data storage 107, which allows to write greater sizes of data and avoid loss thereof.

FIG. 2 illustrates a second generalized functional block diagram of a storage system in accordance with certain embodiments of the present invention. Contrary to storage system depicted in FIG. 1, the storage system shown in FIG. 2 does not include non-volatile storage which is external to permanent storage subsystem 104. Accordingly, in an emergency power failure scenario, data is transferred from external volatile cache 105 and written to permanent subsystem 104 to avoid loss thereof. To this end, UPS 106 provides power to both storage control module 103 and permanent storage subsystem 104. Since permanent storage subsystem 104 is generally larger than non-volatile storage 107 more power is required in order to maintain such a system active during a power failure in comparison to the system described above with reference to FIG. 1. However, the same principles which were described above in respect of forcing the reduction of CPU frequency and the adaptation of the CPU frequency to the writing speed can also be implemented in the storage system illustrated in FIG. 2.

It should be noted that although principles of the invention are described herein with reference to the storage systems shown in FIG. 1 and FIG. 2, it should not be construed as limiting and the same principles can be implemented in any computer system which is supported by a UPS, such as for example a PC.

In order to further reduce power consumption of UPS power during a power failure situation, power control unit 108 can also be configured to control the operation of peripheral devices. For example, power control unit 108 can be configured to shut down one or more fans responsive to an indication of a power failure. In some implementations power control unit 108 can be configured to control both CPU frequency peripherals, such as fans.

Typically one or more fans are used for cooling different components of a computer system in order to avoid any damage to these components as a result of overheating. Components which produce heat and are susceptible to performance loss and damage include for example, processing units (e.g. CPU 109) and storage units (e.g. Non-volatile data storage 107 and volatile cache 105). However, since the power supplied by the UPS enables to operate storage control module 103 and its associated components only for a limited period of time, the risk of overheating is reduced. Therefore, it is possible to disable some or all of the fans and thereby enable to utilize more of the UPS capacity (e.g. UPS power) for writing write-pending data to non-volatile data storage unit 107.

Power control unit 108 can be further configured to monitor the temperature of storage control module 103 and possibly a part or all of its associated components, and control the operation of one or more fans according to the measured temperature. For example, in case the power control unit 108 determines that the temperature exceeds a predefined threshold, it may turn back on one or more fans. To this end, power control unit 108 can be associated with one or more thermometers (not shown).

Controlling the operation of the fans is particularly efficient when implemented in combination with a storage system having a non-volatile storage unit which is external to permanent storage subsystem 104, such as non-volatile storage unit 107 illustrated in FIG. 1. In such storage systems, during power failure the write-pending data is written to non-volatile storage unit 107 and not to permanent storage subsystem 104. As non-volatile storage unit 107 is considerably smaller than permanent storage subsystem 104 the writing process generates considerably less heat and therefore it can withstand a longer period of time with less or no operating fans.

Power control unit 108 can be configured to control both the CPU frequency and the operation of one or more fans. Alternatively, power control unit 108 can be configured to control only one of CPU frequency and operation of one or more fans.

The same principles which were described above in respect of shutting down one or more fans for the purpose of reducing power consumption by the fans can also be implemented in the storage system illustrated in FIG. 2.

FIG. 3 illustrates a first generalized flow-chart of operations carried out in accordance with certain embodiments of the present invention. Initially an indication of a power failure is received (Block 310). The indication is received by at least storage control module 103. In response to the indication of a power failure, a UPS becomes operable to supply power for a limited period of time, instead of the failing power source. During this time write-pending data which is stored at external volatile cache 105 is written to permanent data storage in order to avoid any loss of data. Permanent data storage can be for example non-volatile storage 107 or permanent Storage Subsystem 104.

In response to an indication of a power failure, power control unit 108 is configured to obtain information in respect of the writing speed of data from a volatile cache to a non-volatile storage (Block 310). For example, in case a volatile cache memory 105 and external non-volatile Storage 107 are used, the writing speed of write-pending data from the former to the latter is obtained. Next the CPU operational frequency is adapted to the writing speed (Block 330) and the write-pending data is written to the non-volatile storage (Block 340).

FIG. 4 illustrates a second generalized flow-chart of operations carried out in accordance with certain embodiments of the present invention. As described above with reference to FIG. 3 initially an indication of a power failure is received (Block 410) and a UPS is activated. In response to this indication and in order to reduce energy consumption, one or more fans are deactivated (Block 420) and write-pending data is written to the non-volatile storage (Block 430). The operation of fan shutdown can be performed for example by power control unit 108. During the writing process the temperature of data storage module 103 and possibly of part or all of its associated components is monitored (Block 440) and in case it exceeds a predefined threshold one or more of the fans which were previously turned off are re-activated (Block 460).

FIG. 5 illustrates a third flow-chart of operations carried out in accordance with certain embodiments of the present invention. The operations described with reference to Block 410-440 are similar to those described above with reference to FIG. 4. In case it is determined that the temperature does not exceed a predefined threshold (Block 455) it is next determined whether the temperature is lower than a second predetermined threshold (Block 530). An affirmative answer indicates that the current temperature allows more fans to be turned off. Accordingly, it is determined whether there are any working fans (Block 520), and if there are, one or more of these fans are turned off (Block 470). These operations enable to continuously update the number of operating fans according to the measured temperature and thereby save power while avoiding damaging the system components (e.g. data storage and CPU) due to increased temperature.

It is to be understood that the invention is not limited in its application to the details set forth in the description contained herein or illustrated in the drawings. The invention is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the present invention.

It will also be understood that the system according to the invention may be a suitably programmed computer. Likewise, the invention contemplates a computer program being readable by a computer for executing the method of the invention. The invention further contemplates a machine-readable memory tangibly embodying a program of instructions executable by the machine for executing the method of the invention.

The invention claimed is:

1. A computer system comprising:
   a storage control module operatively coupled to at least a volatile cache memory and to a non-volatile data storage and being operable to control writing of write-pending data from the volatile cache memory to the non-volatile data storage;
   a UPS operatively coupled to at least the storage control module, the volatile cache memory and the non-volatile data storage; and
   a power control unit operatively coupled to at least one processor associated with said non-volatile data storage and, responsive to an indication of a power failure, operable to control a frequency of said at least one processor so as to reduce its power consumption rate and provide extended time for writing said write-pending data to the non-volatile data storage;
   wherein said at least one processor is configured to execute a writing process of transferring data from said volatile cache memory to said non-volatile data storage; and
   wherein said power control unit is further configured to obtain a writing speed to said non-volatile data storage; wherein the controlling of said frequency comprises adapting said frequency to said writing speed, and wherein the adapted frequency determines an operational speed of said at least one processor, thereby avoiding idle time of said at least one processor waiting for said non-volatile data storage and avoiding idle time of said non-volatile data storage waiting for writing instructions from said at least one processor.

2. The system of claim 1 wherein said non-volatile data storage is part of a permanent storage subsystem operatively coupled to said storage control module.

3. The system of claim 1 wherein said non-volatile data storage is storage which is external to a permanent storage subsystem, operatively coupled to said storage control module.

4. The system of claim 1 wherein said controlling of said frequency includes forcing a reduction of said frequency immediately after said indication is received.

5. The system of claim 1 wherein said power control unit is configured to control the clock speed of said at least one processor and thereby control said frequency.

6. The system of claim 1 further comprising one or more fans configured for cooling one or more components of said computer system, and in response to said indication, said power control unit is further operable to disable at least one of said fans to enable for use more power for writing said write-pending data to the non-volatile data storage.

7. The system of claim 6 wherein said power control unit is further operable to monitor the temperature of one or more of said one or more components and in case said temperature exceeds a predefined threshold to re-activate at least one of said disabled fan.

8. The system of claim 6 wherein said wherein said power control unit is further operable to monitor the temperature of one or more of said one or more components and in case said temperature exceeds a predefined threshold to re-activate at least one of said disabled fans; and in response to a temperature which is lower than a predefined threshold, to disable one or more of operating fans, thereby reducing the power consumption by said one or more fans, while avoiding damage which may result from overheating.

9. The system of claim 1 wherein said non-volatile storage can be a flash memory or one or more disk drives.

10. A method for operating a computer system comprising a storage control module operatively coupled to a volatile cache memory and to a non-volatile data storage being operable to control writing of write-pending data from the volatile cache memory to the non-volatile data storage, the method comprising:
 in response to an indication of a power failure, operating a UPS operatively coupled to at least the storage control module, the volatile cache memory and the non-volatile data storage;
 controlling a frequency of at least one processor associated with said storage control module, so as to reduce its power consumption rate and provide extended time for writing said write-pending data to the non-volatile data storage;
 utilizing said at least one processor for executing a writing process for transferring data from said volatile cache memory to said non-volatile data storage; and
 obtaining a writing speed to said non-volatile data storage and adapting said frequency to said writing speed, wherein said controlling of said frequency comprises adapting said frequency to said writing speed, wherein the adapted frequency determines an operational speed of said at least one processor, thereby avoiding idle time of said at least one processor waiting for said non-volatile data storage and avoiding idle time of said non-volatile data storage waiting for writing instructions from said at least one processor.

11. The method of claim 10 wherein said controlling of said frequency includes at least forcing the reduction of said frequency immediately after said indication is received.

12. The method of claim 10 wherein said non-volatile data storage is part of a permanent storage subsystem operatively coupled to said storage control module.

13. The method of claim 10 wherein said non-volatile data storage is a storage which is external to a permanent storage subsystem operatively coupled to said storage control module.

14. The method of claim 10 wherein said storage system further comprises one or more fans configured for cooling one or more components of said computer system, and in response to an indication of a power failure, said method further comprising, disabling at least one of said fans and providing more power for writing said write-pending data to the non-volatile data storage.

15. The method of claim 14 further comprising monitoring the temperature of at least one of said one or more components and in case said temperature exceeds a predefined threshold, re-activating at least one of said disabled fan.

16. The method of claim 14 further comprising:
 monitoring the temperature of at least one of said one or more components and in case said temperature exceeds a predefined threshold, re-activating at least one of said one or more fans; and
 in case said temperature is lower than a predefined threshold, disabling one or more operating fans, thereby reducing the power consumption by said one or more fans, while avoiding damage which may result from overheating.

17. A power control unit configured to be operatively coupled to a computer system, the computer system comprising at least a storage control module operatively coupled to at least a volatile cache memory and to a non-volatile data storage and being operable to control writing of write-pending data from the volatile cache memory to the non-volatile data storage; and,
 a UPS operatively coupled to at least the storage control module, the volatile cache memory and the non-volatile data storage;
 said power control unit is configured to be coupled to at least one processor associated with said non-volatile data storage and, responsive to an indication of a power failure, operable to control a frequency of said at least one processor so as to reduce its power consumption rate and provide extended time for writing said write-pending data to the non-volatile data storage;
 wherein said at least one processor is configured to execute a writing process of transferring data from said volatile cache memory to said non-volatile data storage; and
 wherein said power control unit is further configured to obtain a writing speed to said non-volatile data storage; wherein the controlling of said frequency includes adapting said frequency to said writing speed, wherein the adapted frequency determines an operational speed of said at least one processor, thereby avoiding idle time of said at least one processor waiting for said non-volatile data storage and avoiding idle time of said non-volatile data storage waiting for writing instructions from said at least one processor.

18. The power control unit of claim 17 is further operable to disable at least one fan of one or more fans associated with said computer system in order to further enable for use more UPS capacity for writing said write-pending data to the non-volatile data storage.

19. A program storage device readable by machine, tangibly embodying a program of instructions executable by the machine to perform a method step for operating a computer system comprising a storage control module operatively coupled to a volatile cache memory and to a non-volatile data storage being operable to control writing of write-pending data from the volatile cache memory to the non-volatile data storage, the method comprising:

- in response to an indication of a power failure, operating a UPS operatively coupled to at least the storage control module, the volatile cache memory and the non-volatile data storage; and,
- controlling a frequency of at least one processor associated with said storage control module, so as to reduce its power consumption rate and provide extended time for writing said write-pending data to the non-volatile data storage;
- utilizing said at least one processor for executing a writing process for transferring data from said volatile cache memory to said non-volatile data storage; and
- obtaining a writing speed to said non-volatile data storage and adapting said frequency to said writing speed, wherein said controlling of said frequency comprises adapting said frequency to said writing speed, wherein the adapted frequency determines an operational speed of said at least one processor, thereby avoiding idle time of said at least one processor waiting for said non-volatile data storage and avoiding idle time of said non-volatile data storage waiting for writing instructions from said at least one processor.

\* \* \* \* \*